(12) United States Patent
Alizadeh-Shabdiz et al.

(10) Patent No.: US 9,955,358 B2
(45) Date of Patent: *Apr. 24, 2018

(54) DETERMINING QUALITY METRICS UTILIZED IN BUILDING A REFERENCE DATABASE

(71) Applicant: Skyhook Wireless, Inc., Boston, MA (US)

(72) Inventors: Farshid Alizadeh-Shabdiz, Wayland, MA (US); Kaveh Pahlavan, Newton, MA (US); Nicolas Brachet, Newton, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,161

(22) Filed: May 18, 2016

(65) Prior Publication Data

US 2016/0269914 A1    Sep. 15, 2016

Related U.S. Application Data

(63) Continuation of application No. 12/404,664, filed on Mar. 16, 2009, now Pat. No. 9,363,785, which is a
(Continued)

(51) Int. Cl.
*H04W 24/00* (2009.01)
*H04W 16/18* (2009.01)
(Continued)

(52) U.S. Cl.
CPC .......... *H04W 16/18* (2013.01); *H04B 17/318* (2015.01); *H04W 24/10* (2013.01);
(Continued)

(58) Field of Classification Search
CPC ..... H04W 48/16; H04W 88/06; H04W 48/20; H04W 4/02; H04W 64/00; H04W 84/12;
(Continued)

(56) References Cited

U.S. PATENT DOCUMENTS 6,119,013 A     9/2000  Maloney et al.
6,272,405 B1    8/2001  Kubota et al.
(Continued)

FOREIGN PATENT DOCUMENTS

EP    1612999 A1    1/2006
JP    09074585      3/1997
(Continued)

OTHER PUBLICATIONS

Chan, et al., "Collaborative Localization: Enhancing WiFi-Based Position Estimation with Neighborhood Links in Clusters," May 2006, 18 pages.
(Continued)

*Primary Examiner* — Fred Casca
(74) *Attorney, Agent, or Firm* — Cesari and McKenna, LLP; James A. Blanchette

(57) ABSTRACT

In one embodiment, a technique is provided for building a reference database used to estimate a position of a wireless local area network (WLAN) enabled device. Samples are obtained for WLAN access points, the samples for each WLAN access point being based on WLAN signals transmitted by the WLAN access point and received by one or more scanning devices. Software of a WLAN positioning system executing on one or more computing devices estimates a position of each WLAN access point based on the samples of the WLAN access point. The software also estimates a geographical area covered by the samples of each WLAN access point and determines a quality metric of each WLAN access point based on the estimated geographi-
(Continued)

cal area covered by the samples of the WLAN access point. The software then builds the reference database based on the estimated position and quality metric of each WLAN access point.

20 Claims, 4 Drawing Sheets

Related U.S. Application Data continuation of application No. 11/430,224, filed on May 8, 2006, now Pat. No. 7,551,579.

(51) Int. Cl.
| | |
|---|---|
| H04W 48/16 | (2009.01) |
| H04W 88/06 | (2009.01) |
| H04W 48/20 | (2009.01) |
| H04W 64/00 | (2009.01) |
| H04B 17/318 | (2015.01) |
| H04W 24/10 | (2009.01) |
| H04W 36/22 | (2009.01) |
| H04W 84/12 | (2009.01) |
| H04W 88/08 | (2009.01) |

(52) U.S. Cl.
CPC ........... *H04W 48/16* (2013.01); *H04W 48/20* (2013.01); *H04W 64/00* (2013.01); *H04W 64/006* (2013.01); *H04W 88/06* (2013.01); H04W 36/22 (2013.01); H04W 84/12 (2013.01); H04W 88/08 (2013.01)

(58) Field of Classification Search
CPC ..... H04W 24/08; H04W 36/22; H04W 48/18; H04W 64/003; H04W 28/08; H04W 4/008; H04W 84/18; H04W 84/20; H04W 8/005
USPC ...... 455/574, 307, 414.1, 418, 426.1, 432.1, 455/434, 435.1, 435.2, 456.4, 456.6, 519, 455/525, 67.11; 340/12.5, 12.52, 5.7, 340/8.1; 370/252, 329, 254, 338, 328, 370/331, 238
See application file for complete search history.

(56) References Cited

U.S. PATENT DOCUMENTS

| | | | |
|---|---|---|---|
| 6,421,330 B1 | 7/2002 | Chung et al. | |
| 6,678,611 B2 | 1/2004 | Khavakh et al. | |
| 6,853,847 B2 | 2/2005 | Shioda et al. | |
| 6,888,811 B2 | 5/2005 | Eaton et al. | |
| 6,978,023 B2 | 12/2005 | Dacosta | |
| 7,123,928 B2 | 10/2006 | Moeqlein et al. | |
| 7,167,715 B2 | 1/2007 | Stanforth | |
| 7,167,716 B2 | 1/2007 | Kim et al. | |
| 7,250,907 B2 | 7/2007 | Krumm et al. | |
| 7,277,054 B2 | 10/2007 | Alanen et al. | |
| 7,305,245 B2 | 12/2007 | Alizadeh-Shabdiz et al. | |
| 7,397,424 B2 | 7/2008 | Houri | |
| 7,403,762 B2 | 7/2008 | Morgan et al. | |
| 7,414,988 B2 | 8/2008 | Jones et al. | |
| 7,433,694 B2 | 10/2008 | Morgan et al. | |
| 7,433,696 B2 | 10/2008 | Dietrich et al. | |
| 7,460,870 B2 | 12/2008 | Moeglein et al. | |
| 7,471,954 B2 | 12/2008 | Brachet et al. | |
| 7,474,646 B2 | 1/2009 | Tamaki | |
| 7,474,897 B2 | 1/2009 | Morgan et al. | |
| 7,493,127 B2 | 2/2009 | Morgan et al. | |
| 7,502,620 B2 | 3/2009 | Morgan et al. | |
| 7,515,548 B2 | 4/2009 | Chandra et al. | |
| 7,515,578 B2 | 4/2009 | Alizadeh-Shabdiz et al. | |
| 7,551,579 B2 | 6/2009 | Alizadeh-Shabdiz et al. | |
| 7,551,929 B2 | 6/2009 | Alizadeh-Shabdiz et al. | |
| 7,768,963 B2 | 8/2010 | Alizadeh-Shabdiz | |
| 7,769,306 B2 | 8/2010 | Able et al. | |
| 7,856,234 B2 | 12/2010 | Alizadeh-Shabdiz et al. | |
| 8,130,148 B2 | 3/2012 | Alizadeh-Shabdiz | |
| 8,154,454 B2 | 4/2012 | Alizadeh-Shabdiz | |
| 2001/0038356 A1 | 11/2001 | Frank | |
| 2003/0054771 A1 | 3/2003 | Chappaz | |
| 2003/0054830 A1 | 3/2003 | Williams et al. | |
| 2003/0118015 A1 | 6/2003 | Gunnarsson et al. | |
| 2003/0125045 A1 | 7/2003 | Riley et al. | |
| 2003/0218570 A1 | 11/2003 | Moore et al. | |
| 2003/0225893 A1 | 12/2003 | Roese et al. | |
| 2004/0019679 A1 | 1/2004 | E et al. | |
| 2004/0039520 A1 | 2/2004 | Khavakh et al. | |
| 2004/0057408 A1 | 3/2004 | Gray | |
| 2004/0081133 A1 | 4/2004 | Smavarkul et al. | |
| 2004/0087317 A1 | 5/2004 | Caci | |
| 2004/0166864 A1 | 8/2004 | Hill et al. | |
| 2004/0203420 A1 | 10/2004 | Rick et al. | |
| 2004/0203880 A1 | 10/2004 | Riley | |
| 2004/0203904 A1* | 10/2004 | Gwon | G01S 5/0252 455/456.1 |
| 2004/0205234 A1 | 10/2004 | Barrack et al. | |
| 2005/0003827 A1 | 1/2005 | Whelan | |
| 2005/0020266 A1 | 1/2005 | Backes et al. | |
| 2005/0037775 A1 | 2/2005 | Moeglein et al. | |
| 2005/0073980 A1 | 4/2005 | Thomson et al. | |
| 2005/0090266 A1 | 4/2005 | Sheynblat | |
| 2005/0107953 A1 | 5/2005 | Sugla | |
| 2005/0192024 A1 | 9/2005 | Sheynblat | |
| 2005/0208919 A1 | 9/2005 | Walker et al. | |
| 2005/0215201 A1 | 9/2005 | Cao et al. | |
| 2005/0246334 A1 | 11/2005 | Tao et al. | |
| 2005/0270236 A1 | 12/2005 | Krumm et al. | |
| 2006/0009235 A1 | 1/2006 | Sheynblat et al. | |
| 2006/0025153 A1 | 2/2006 | Inaba et al. | |
| 2006/0046709 A1 | 3/2006 | Krumm et al. | |
| 2006/0052115 A1 | 3/2006 | Khushu | |
| 2006/0072502 A1 | 4/2006 | Crandall et al. | |
| 2006/0078122 A1 | 4/2006 | Dacosta | |
| 2006/0089157 A1 | 4/2006 | Casey et al. | |
| 2006/0095348 A1 | 5/2006 | Jones et al. | |
| 2006/0095349 A1 | 5/2006 | Morgan et al. | |
| 2006/0106850 A1 | 5/2006 | Morgan et al. | |
| 2006/0176849 A1* | 8/2006 | Gass | H04W 64/00 370/328 |
| 2006/0197704 A1 | 9/2006 | Luzzatto et al. | |
| 2006/0200843 A1 | 9/2006 | Morgan et al. | |
| 2006/0217131 A1 | 9/2006 | Alizadeh-Shabdiz et al. | |
| 2006/0221918 A1 | 10/2006 | Wang | |
| 2006/0229088 A1 | 10/2006 | Walter | |
| 2006/0240840 A1 | 10/2006 | Morgan et al. | |
| 2006/0256803 A1 | 11/2006 | Nakata et al. | |
| 2007/0004427 A1 | 1/2007 | Morgan et al. | |
| 2007/0004428 A1 | 1/2007 | Morgan et al. | |
| 2007/0018891 A1 | 1/2007 | Golden et al. | |
| 2007/0025820 A1 | 2/2007 | Seech et al. | |
| 2007/0077968 A1 | 4/2007 | Kuzminskiy | |
| 2007/0097511 A1 | 5/2007 | Das et al. | |
| 2007/0121560 A1 | 5/2007 | Edge | |
| 2007/0126635 A1 | 6/2007 | Houri | |
| 2007/0139269 A1 | 6/2007 | Chen et al. | |
| 2007/0150516 A1 | 6/2007 | Morgan et al. | |
| 2007/0202888 A1 | 8/2007 | Brachet et al. | |
| 2007/0232892 A1 | 10/2007 | Hirota | |
| 2007/0247367 A1 | 10/2007 | Anjum et al. | |
| 2007/0258408 A1 | 11/2007 | Alizadeh-Shabdiz et al. | |
| 2007/0258409 A1 | 11/2007 | Alizadeh-Shabdiz et al. | |
| 2007/0258420 A1 | 11/2007 | Alizadeh-Shabdiz et al. | |
| 2007/0258421 A1 | 11/2007 | Alizadeh-Shabdiz et al. | |
| 2007/0259624 A1 | 11/2007 | Alizadeh-Shabdiz et al. | |
| 2008/0008117 A1 | 1/2008 | Alizadeh-Shabdiz | |
| 2008/0008118 A1 | 1/2008 | Alizadeh-Shabdiz | |
| 2008/0008119 A1 | 1/2008 | Alizadeh-Shabdiz | |
| 2008/0008120 A1 | 1/2008 | Alizadeh-Shabdiz | |
| 2008/0008121 A1 | 1/2008 | Alizadeh-Shabdiz | |
| 2008/0033646 A1 | 2/2008 | Morgan et al. | |
| 2008/0108371 A1 | 5/2008 | Alizadeh-Shabdiz et al. | |

(56) References Cited

U.S. PATENT DOCUMENTS

| | | |
|---|---|---|
| 2008/0132170 A1 | 6/2008 | Alizadeh-Shabdiz et al. |
| 2008/0139217 A1 | 6/2008 | Alizadeh-Shabdiz et al. |
| 2008/0176583 A1 | 7/2008 | Brachet et al. |
| 2008/0180319 A1 | 7/2008 | Islam et al. |
| 2008/0242305 A1 | 10/2008 | Kahlert et al. |
| 2008/0248741 A1 | 10/2008 | Alizadeh-Shabdiz |
| 2008/0248808 A1 | 10/2008 | Alizadeh-Shabdiz |
| 2009/0075672 A1 | 3/2009 | Jones et al. |
| 2009/0149197 A1 | 6/2009 | Morgan et al. |
| 2009/0154371 A1 | 6/2009 | Alizadeh-Shabdiz et al. |
| 2009/0175189 A1 | 7/2009 | Alizadeh-Shabdiz et al. |
| 2009/0252138 A1 | 10/2009 | Alizadeh-Shabdiz et al. |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz |
| 2009/0312035 A1 | 12/2009 | Alizadeh-Shabdiz |
| 2009/0312036 A1 | 12/2009 | Alizadeh-Shabdiz |
| 2010/0052983 A1 | 3/2010 | Alizadeh-Shabdiz |
| 2011/0012780 A1 | 1/2011 | Alizadeh-Shabdiz |
| 2011/0012784 A1 | 1/2011 | Alizadeh-Shabdiz |
| 2011/0021207 A1 | 1/2011 | Morgan et al. |
| 2011/0035420 A1 | 2/2011 | Alizadeh-Shabdiz et al. |
| 2011/0045840 A1 | 2/2011 | Alizadeh-Shabdiz et al. |
| 2011/0058495 A1 | 3/2011 | Alizadeh-Shabdiz et al. |
| 2011/0074626 A1 | 3/2011 | Alizadeh-Shabdiz et al. |
| 2011/0080317 A1 | 4/2011 | Alizadeh-Shabdiz et al. |
| 2011/0080318 A1 | 4/2011 | Alizadeh-Shabdiz et al. |
| 2011/0080841 A1 | 4/2011 | Alizadeh-Shabdiz et al. |
| 2011/0164522 A1 | 7/2011 | Alizadeh-Shabdiz et al. |
| 2011/0235532 A1 | 9/2011 | Alizadeh-Shabdiz et al. |
| 2011/0235623 A1 | 9/2011 | Alizadeh-Shabdiz et al. |
| 2011/0287783 A1 | 11/2011 | Alizadeh-Shabdiz et al. |
| 2011/0298660 A1 | 12/2011 | Alizadeh-Shabdiz |
| 2011/0298663 A1 | 12/2011 | Alizadeh-Shabdiz |
| 2011/0298664 A1 | 12/2011 | Alizadeh-Shabdiz |
| 2011/0306357 A1 | 12/2011 | Alizadeh-Shabdiz et al. |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |
| 2012/0100872 A1 | 4/2012 | Alizadeh-Shabdiz et al. |
| 2012/0108260 A1 | 5/2012 | Alizadeh-Shabdiz |
| 2012/0112958 A1 | 5/2012 | Alizadeh-Shabdiz et al. |
| 2012/0196621 A1 | 8/2012 | Alizadeh-Shabdiz et al. |
| 2012/0280866 A1 | 11/2012 | Alizadeh-Shabdiz |

FOREIGN PATENT DOCUMENTS

| | | |
|---|---|---|
| JP | 2002-057614 | 2/2002 |
| JP | 2003-185727 A | 7/2003 |
| JP | 2003-329757 | 11/2003 |
| JP | 2004-112482 | 4/2004 |
| JP | 2006-080681 A | 3/2006 |
| WO | WO-03/102620 A1 | 12/2003 |
| WO | WO-2003/102620 A1 | 12/2003 |
| WO | WO-2004/016032 | 2/2004 |
| WO | WO-2004/036240 | 4/2004 |
| WO | WO-2005/121829 A1 | 12/2005 |
| WO | WO-2006/070211 A1 | 7/2006 |
| WO | WO-2006/110181 | 10/2006 |
| WO | WO-2006/117587 A1 | 11/2006 |
| WO | WO-2007/133967 | 11/2007 |
| WO | WO-2007/133968 | 11/2007 |
| WO | WO-2008/057737 | 5/2008 |
| WO | WO-2011/011201 | 1/2011 |

OTHER PUBLICATIONS

"Delta Encoding", Wikipedia, retrieved from http://en.wikipedia.org/wiki/Delta_encoding, Mar. 1, 2006, 3 pages.

European Search Report for Application No. 11190959 dated Jan. 23, 2012, 3 pages.

European Search Report and Written Opinion for European Application No. 07783288, dated Jun. 3, 2010, 7 pages.

European Search Report for European Application No. 07868513, dated Jun. 7, 2010, 5 pages.

Griswold et al., "ActiveCampus—Sustaining Educational Communities through Mobile Technology," UCSD CSE Technical Report #CS200-0714, Jul. 2002, 19 pages.

Hazas, M., et al., "Location-Aware Computing Comes of Age," IEEE, vol. 37, Feb. 2004, pp. 95-97.

Hellebrandt, M., et al., "Estimating Position and Velocity of Mobile in a Cellular Radio Network," IEEE Transactions on Vehicular Technology, vol. 46, No. 1, Feb. 1997, pp. 65-71.

Hightower, et al., "Particle Filters for Location Estimation in Ubiquitous Computing: A Case Study," Sep. 2004, 18 pages.

"Huffman Coding", Wikipedia, retrieved from http://en.wikipedia.org/wiki/Huffman_coding, Mar. 1, 2006, 6 pages.

International Search Report and Written Opinion of the International Searching Authority, the United States Patent and Trademark Office, for International Application No. PCt/US2007/068248, mailing date of Aug. 6, 2008, 4 pages.

International Search Report and Written Opinion of the International Searching Authority, the United States Patent and Trademark Office, for International Application No. PCT/US2010/041279, mailing date of Sep. 1, 2010, 7 pages.

International Search Report, International Application No. PCT/US05/39208, mailed Jan. 29, 2008, 3 pages.

International Search Report and Written Opinion, International Application No. PCT/US07/68251, mailed Aug. 25, 2008, 8 pages.

International Search Report, International Patent Application No. PCT/US07/81929, mailed Apr. 16, 2008, 2 pages.

Kawabata, K., "Estimating Velocity Using Diversity Reception," IEEE, Mar. 1994, pp. 371-374.

Kim, M., et al., "Risks of using AP locations discovered through war driving," Lecture Notes in Computer Science, vol. 3968, Pervasive Computing. May 19, 2006, pp. 67-81.

Kirsner, S., "One more way to find yourself," The Boston Globe, May 23, 2005, Retrieved from www.boston.com on Mar. 24, 2006, 2 pages.

Krumm, J., et al., "LOCADIO: Inferring Motion and Location from Wi-Fi Signal Strengths," First Annual International Conference on Mobile and Ubiquitous Systems: Networking and Services, Aug. 2004, 10 pages.

Kwan, M., "Graphic Programming Using Odd or Even Points," Chinese Math. 1, 1962, pp. 273-277.

Lamarca, A., et al., "Place Lab: Device Positioning Using Radio Beacons in the Wild," Intel Corporation, 2004, 21 pages.

Lamarca, A., et al., "Place Lab: Device Positioning Using Radio Beacons in the Wild," Pervasive Computing, Intel Corporation, Oct. 2004, pp. 116-133.

Muthukrishnan, K., et al., "Towards Smart Surroundings: Enabling Techniques and Technologies for Localization," Lecture Notes in Computer Science, vol. 3479, May 2005, 11 pages.

"Terminal Equipment and Protocols for Telematic Services: Information Technology—Digital Compression and Coding of Continuous-Tome Still Images—Requirements and Guidelines," International Telecommunication Union, Sep. 1992, 185 pages.

Supplemental European Search Report for EP07783288.9, dated Jun. 3, 2010, 7 pages.

Supplemental European Search Report for EP07761894, dated Jun. 3, 2010, 8 pages.

\* cited by examiner

DETERMINING QUALITY METRICS UTILIZED IN BUILDING A REFERENCE DATABASE

CROSS-REFERENCE TO RELATED APPLICATIONS

This application is a continuation of and claims priority under 35 U.S.C. § 120 to U.S. patent application Ser. No. 12/404,664, filed on Mar. 16, 2009 entitled Calculation of Quality of WLAN Access Point Characterization for Use in a WLAN Positioning System, which is a continuation of U.S. patent application Ser. No. 11/430,224, filed on May 8, 2006, now issued as U.S. Pat. No. 7,551,579, entitled Calculation of Quality of WLAN Access Point Characterization for Use in a WLAN Positioning System, the entire contents of both of which are incorporated herein by reference.

This application is related to the following patent applications:

U.S. patent application Ser. No. 11/430,079, filed May 8, 2006, entitled "Estimation Of Speed and Direction of Travel In A WLAN Positioning System";

U.S. patent application Ser. No. 11/429,862, filed May 8, 2006, entitled "Estimation of Speed of Travel Using the Dynamic Signal Strength Variation of Multiple WLAN Access Points";

U.S. patent application Ser. No. 11/430,064, filed May 8, 2006, entitled "Estimation of Speed and Direction of Travel In A WLAN Location Based Service Using Multiple Position Estimations"; and U.S. patent application Ser. No. 11/430,222, filed May 8, 2006, entitled "Estimation of Position Using WLAN Access Point Radio Propagation Characteristics in a WLAN Positioning System", the contents of which are hereby incorporated by reference.

BACKGROUND

Field of the Invention

The invention generally relates to positioning systems and, more specifically, to methods and systems of classifying WLAN access points in a WLAN positioning system. The invention further relates to calculating the quality of estimation of characteristics of the WLAN access points and scaling a reference database accordingly.

Discussion of Related Art

Position determination is the main component of navigation systems and any Location Based Services (LBS). Proliferation of WLAN access points in recent years created a blanket of WLAN radio waves everywhere. Therefore, almost in any place, there is a great possibility of detecting WLAN radio waves, especially in urban areas. The exponential growth of WLAN, and the fact that they can be found almost everywhere, initiated an idea of leveraging them for a metropolitan positioning system for indoor and outdoor areas. In a metropolitan WLAN positioning system, location of WLAN access points are used as reference points, and the Received Signal Strength (RSS) of a WLAN access point is used as an indicator of a distance of an end user from the WLAN access points that the user detects at any time. By knowing the distance of the end user from WLAN access points, location of the end user can be determined. Translating receiver Receive Signal Strength to distance relies on assuming a specific radio channel model. Ideally, if the radio channel model was exactly known, the exact distance of the end user to WLAN access points could be found.

Outdoor and indoor WLAN based positioning systems have been explored by couple of research labs, but none of them included speed and bearing estimation in their system. The most important research efforts in this area have been conducted by PlaceLab (www.placelab.com, a project sponsored by Microsoft and Intel), University of California San Diego ActiveCampus project (ActiveCampus-Sustaining Educational Communities through Mobile Technology, technical report #CS2002-0714), and the MIT campus wide location system, and it was evaluated through several small projects at Dartmouth college (e.g., M. Kim, J. J. Fielding, and D. Kotz, "Risks of using AP locations discovered through war driving").

There have been a number of commercial offerings of Wi-Fi location systems targeted at indoor positioning. (See, e.g., Kavitha Muthukrishnan, Maria Lijding, Paul Havinga, Towards Smart Surroundings: Enabling Techniques and Technologies for Localization, *Proceedings of the International Workshop on Location and Context-Awareness* (*LoCA* 2005) at Pervasive 2005, May 2005, and Hazas, M., Scott, J., Krumm, J.: Location-Aware Computing Comes of Age. IEEE Computer, 37(2):95-97, February 2004 005, Pa005, Pages 350-362.) These systems are designed to address asset and people tracking within a controlled environment like a corporate campus, a hospital facility or a shipping yard. The classic example is having a system that can monitor the exact location of the crash cart within the hospital so that when there is a cardiac arrest the hospital staff doesn't waste time locating the device. The accuracy requirements for these use cases are very demanding typically calling for 1-3 meter accuracy.

These systems use a variety of techniques to fine tune their accuracy including conducting detailed site surveys of every square foot of the campus to measure radio signal propagation. They also require a constant network connection so that the access point and the client radio can exchange synchronization information similar to how A-GPS works. While these systems are becoming more reliable for indoor use cases, they are ineffective in any wide-area deployment. It is impossible to conduct the kind of detailed site survey required across an entire city and there is no way to rely on a constant communication channel with 802.11 access points across an entire metropolitan area to the extent required by these systems. Most importantly outdoor radio propagation is fundamentally different than indoor radio propagation rendering these indoor positioning algorithms almost useless in a wide-area scenario. The required accuracy of indoor WLAN based positioning systems, makes it hard to use radio channel modeling and it is considered as a research topic in that domain. In addition, none of the WLAN based positioning systems to date have distinguished between access points, and current methods treat all WLAN access points the same.

FIG. 1 depicts a Wi-Fi positioning system (WPS). The positioning system includes positioning software [103] that resides on a computing device [101]. Throughout a particular coverage area there are fixed wireless access points [102] that broadcast information using control/common channel broadcast signals. The client device monitors the broadcast signal or requests its transmission via a probe request. Each access point contains a unique hardware identifier known as a MAC address. The client positioning software receives signal beacons from the 802.11 access points in range and calculates the geographic location of the computing device using characteristics from the signal beacons. Those characteristics include the unique identifier of the 802.11 access point, known as the MAC address, and the strengths of the signal reaching the client device. The client software compares the observed 802.11 access points with those in its reference database [104] of access points, which may or may not reside on the device as well. The reference database contains the calculated geographic locations and power profile of all the access points the gathering system has collected. The power profile may be generated from a collection of readings that represent the power of the signal from various locations. Using these known locations, the client software calculates the relative position of the user device [101] and determines its geographic coordinates in the form of latitude and longitude readings. Those readings are then fed to location-based applications such as friend finders, local search web sites, fleet management systems and E911 services.

SUMMARY

The invention provides methods and systems for classifying WLAN access points according to the quality of estimation of characteristics of the WLAN access points. The classifications may be used to scale a reference database and quantify an expected error of estimation of the characteristics of the WLAN access points. Under one aspect of the invention, WLAN access points are classified based on their impact on a user's position, speed of travel, and direction of travel estimation accuracy in a WLAN positioning system.

Under another aspect of the invention, a positioning system has a plurality of Wi-Fi access points in a target area. A method for determining a quality of estimation of characteristics of a Wi-Fi access point comprises a Wi-Fi enabled scanning device receiving and measuring a number of received signal strength (RSS) samples of the a Wi-Fi signal transmitted by the Wi-Fi access point. A total distance traveled by the Wi-Fi enabled scanning device while measuring the number of RSS samples is estimated. The quality of estimation of characteristics of the Wi-Fi access point is estimated using the total distance traveled by the Wi-Fi enabled scanning device.

Under another aspect of the invention, the characteristics of the Wi-Fi access point include at least one of geographic location of the Wi-Fi access point and radio propagation characteristics of the Wi-Fi access point.

Under another aspect of the invention, a positioning system has a plurality of Wi-Fi access points in a target area. A method for determining a quality of estimation of characteristics of a Wi-Fi access point comprises a Wi-Fi enabled scanning device receiving and measuring a number of received signal strength (RSS) samples of the Wi-Fi signal transmitted by the Wi-Fi access point. A corresponding speed of travel of the Wi-Fi enabled scanning device is associated with each RSS sample. A corresponding period of time of scanning is associated with each RSS sample. A confidence factor is determined using the sum of each of the speeds of travel of the Wi-Fi enabled scanning device weighted by the corresponding period of time of scanning for each RSS sample. The quality of estimation is determined using the confidence factor.

Under another aspect of the invention, a positioning system has a plurality of Wi-Fi access points in a target area. A method for determining a quality of estimation of characteristics of a Wi-Fi access point comprises a Wi-Fi enabled scanning device receiving and measuring a number of received signal strength (RSS) samples of the Wi-Fi signal transmitted by the Wi-Fi access point. A corresponding speed of travel of the Wi-Fi enabled scanning device is associated with each RSS sample. A corresponding period of time of scanning is associated with each RSS sample. A confidence factor is determined using the number of RSS samples and the speeds of travel of the Wi-Fi enabled scanning device weighted by the corresponding period of time of scanning for each RSS sample. The quality of estimation is determined using the confidence factor.

Under another aspect of the invention, a method for estimating the position of a Wi-Fi enabled device comprises identifying Wi-Fi access points within range of the Wi-Fi enabled device. Calculated locations and quality of estimation values corresponding to the identified Wi-Fi access points are retrieved from a reference database. The position of the Wi-Fi enabled device is estimated using the calculated locations and quality of estimation values.

Under another aspect of the invention, at least one quality of estimation value corresponding to a Wi-Fi access points determines a weight assigned to a calculated location of the corresponding Wi-Fi access point for use in estimating the position of the Wi-Fi enabled device.

Under another aspect of the invention, a calculated location corresponding to a Wi-Fi access points is not used in estimating the position of the Wi-Fi enabled device if a quality of estimation value corresponding to the Wi-Fi access point is below a threshold.

DETAILED DESCRIPTION

Figure 1:
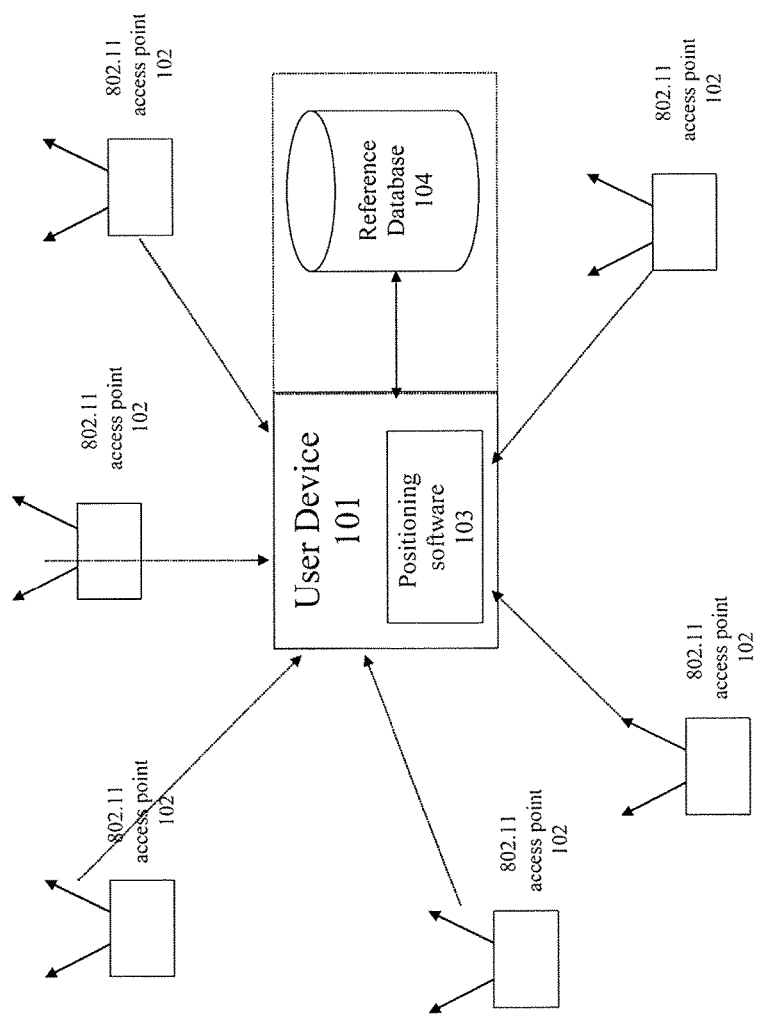
FIG. 1 depicts certain embodiments of a Wi-Fi positioning system.

Embodiments of the invention provide methods and systems to define a quality metric for each WLAN access point (AP) in a WLAN based positioning system. The quality metric of a WLAN access point may be used as an indicator of the expected error of estimation of position, speed of travel, and direction of travel of a user based on that WLAN access point. Quantifying expected error of estimation based on a given WLAN access point can be used to increase the accuracy of overall estimation by giving more weight to more reliable WLAN access points, and it can also be used to quantify expected error of the final estimation of position, speed of travel and direction of travel by considering the quality of an aggregate of the WLAN access points in range.

Embodiments of the present invention build on techniques, systems and methods disclosed in earlier filed applications, including but not limited to U.S. patent application Ser. No. 11/261,848, entitled Location Beacon Database, U.S. patent application Ser. No. 11/261,898, entitled Server for Updating Location Beacon Database, U.S. patent application Ser. No. 11/261,987, entitled Method and System for Building a Location Beacon Database, and U.S. patent application Ser. No. 11/261,988, entitled Location-Based Services that Choose Location Algorithms Based on Number of Detected Access Points Within Range of User Device, all filed on Oct. 28, 2005, the contents of which are hereby incorporated by reference in its entirety. Those applications taught specific ways to gather high quality location data for Wi-Fi access points so that such data may be used in location based services to determine the geographic position of a Wi-Fi-enabled device utilizing such services and techniques of using said location data to estimate the position of a system user. The present techniques, however, are not limited to systems and methods disclosed in the incorporated patent applications. Thus, while reference to such systems and applications may be helpful, it is not believed necessary to understand the present embodiments or inventions.

Because the location of users in a WLAN positioning system are calculated with reference to the location of public and private WLAN access points, any inaccuracy in associated parameters of an access point (AP), for example the geographic location of access point, directly impacts the accuracy of position estimation of the users. Aspects of this invention include a systematic method to classify or quantify the quality of WLAN access points. Also, aspects of the invention can be used to scale a reference database of WLAN access points. Embodiments can be used to quantify the expected error of results of calculations using a given WLAN access point. WLAN access points may then be classified based on their level of accuracy. The knowledge of the accuracy level of the WLAN characteristics can be used, for example, in estimation equations to increase the accuracy of the estimation by using only relatively high quality access points or weighting access points based on their quality.

Characteristics of a WLAN access point, such as its geographic location or radio propagation characteristics, may be estimated by using a Wi-Fi enabled scanning device to collect Received Signal Strength (RSS) samples occurring at corresponding positions. For example, the techniques disclosed in the applications incorporated above may be used.

The total number of samples collected by the scanning device when collecting RSS samples for a given WLAN access point may be used to calculate the expected error of estimation of characteristics for that WLAN access point. The samples are weighted according to the speed of the scanning device when collecting RSS samples. The number of RSS samples weighted according to the speed of the scanning device at the time of RSS sampling may be used as a surrogate for the ratio of the number of samples to the coverage area of an access point.

Figure 2:
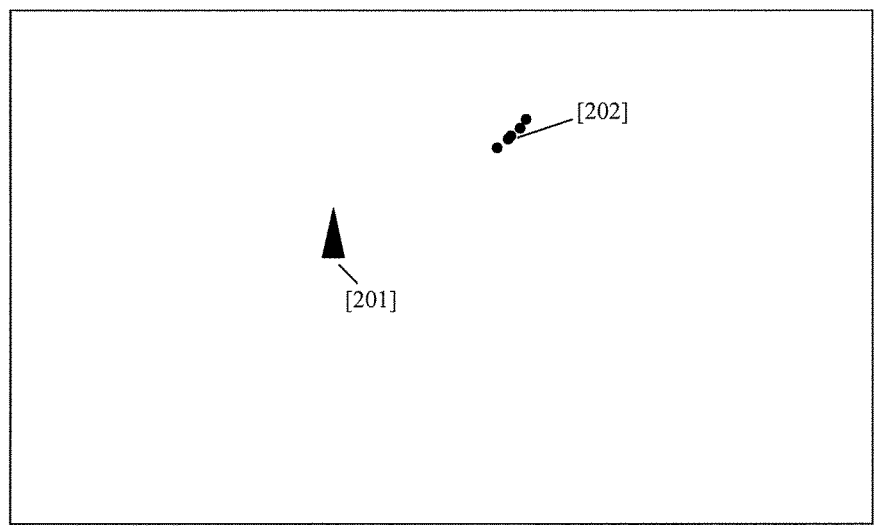
FIG. 2 depicts an example of an access point with a relatively small number of RSS samples.
Figure 3:
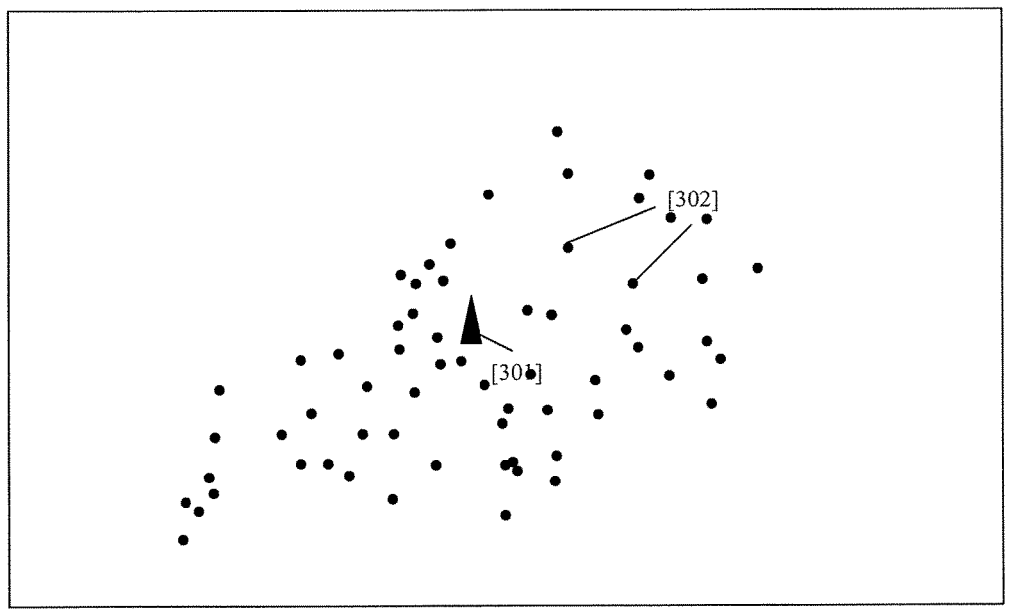
FIG. 3 depicts an example of an access point with a relatively large number of RSS samples.

FIG. 2 depicts an example of a WLAN access point [201] having a relatively low quality of characterization because the number of RSS samples [202] is relatively low. In contrast, FIG. 3 depicts an example of a WLAN access point [301] having a relatively high quality of characterization because the number of RSS samples [302] is relatively high, resulting in relatively high accuracy of estimation of WLAN access point characteristics.

Figure 4:
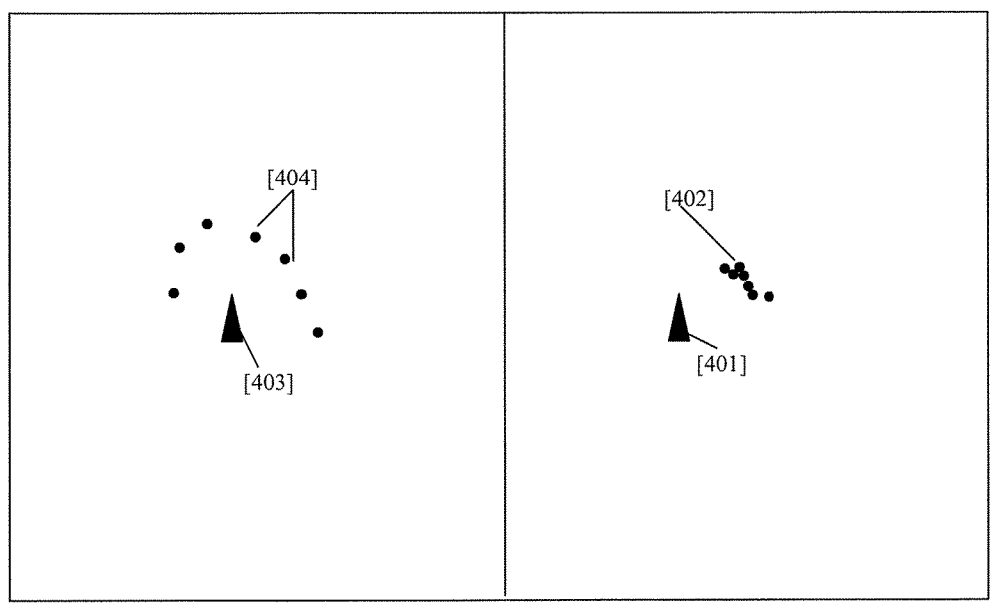
FIG. 4 depicts an example of the impact of total distance of travel of a Wi-Fi enabled scanning device on quality of estimation of WLAN access point characteristics.

FIG. 4 depicts the impact of the speed of the scanning device on the total distance traveled by the scanning device while collecting RSS samples, in which two WLAN access points [401] and [403] with equal numbers of RSS samples [402] and [404] are presented. During the collection of the RSS samples [404] for WLAN access point [403], the scanning device was traveling at a higher speed than when the scanning device was collecting RSS samples [402] for WLAN access point [401]. Where the RSS samples [402] and RSS samples were collected over the same amount of time, the RSS samples [404] cover a greater total distance than the RSS samples [402]. Thus, the RSS samples [404] are a better indicator of the characteristics, for example the power profile, of the WLAN access point [403] as compared to WLAN access point [401].

Under other embodiments of the invention, the quality of estimation of characteristics of a WLAN access point is quantified. A WLAN access point's geographic location and its radio propagation characteristics are estimated based on the RSS samples in its coverage area. The number of RSS samples which are used for estimation of characteristics of an WLAN access point directly impacts the accuracy of estimation. If the number of RSS samples of a WLAN access point is relatively low, the error of estimation of geographic location of the WLAN access point and estimation of its radio propagation characteristics is relatively high. Therefore, WLAN access points with relatively small numbers of RSS samples can be considered to have relatively low reliability when used in a WLAN based positioning system. On the other hand, WLAN access points with relatively high numbers of RSS samples can be considered relatively high reliability WLAN access points. Under one example embodiment, the number of RSS samples can be used to quantify the expected accuracy of position estimation based on the WLAN access points. Since the expected accuracy of position estimation of different WLAN access points is different, the estimation based on them can also be weighted according to their expected error.

In the process of scanning, the speed of the scanning device is not constant. The scanning device might stop for a while or it might move fast along highways. As a result, the same number of RSS samples may cover different geographical areas, as explained in connection with FIG. 4 above. The geographical area that a given number of RSS samples covers is the speed of the scanning device times the period of scanning. Therefore, assuming a constant scanning period, the value of the absolute number of samples is weighted according to the speed of scanning device at time of scanning. The speed of the scanning device at the time of RSS sampling can be collected, for example, from a OPS or it can be derived from OPS position over time. The OPS velocity estimation is very accurate because it is based on Doppler frequency of measurement of the OPS received signal, but velocity calculation based on OPS position over time is a rough estimate of the velocity.

If the estimation of the speed of the scanning device at the time of scanning is known and the total number of scanned RSS samples is denoted by N, a confidence factor, denoted by CFn, is calculated as follows:

$$CFn = \sum_{i=1}^{N} f(V_i T_i)$$

in which $V_i$ is the speed of the scanning device and $T_i$ is the period of scanning at the time of taking RSS sample i, where $0<i<N$. The period of scanning is a constant value almost all the time.

The value of the period of scanning, when it is constant, is shown with $T_0$. The function $f(V_i T_i)$ is a nonlinear function and generally it is as follows: For RSS samples which are taken while the scanning device is moving, the $V_i T_i$ is considered as the weight of samples. For RSS samples which are taken while the scanning device is stationary, all the readings with the same location and the same power reading are considered once. For example, if the scanning device collects RSS power samples while not moving for a given period of time, $T_p$, and power reading from an access point was the same for the entire period $T_p$, only one RSS sample from this access point for the period $T_p$ is considered. Finally, RSS samples taken while the scanning device is stationary are considered with a correction factor K. The correction factor K can be calculated based on the average acceleration of the scanning device from zero speed, $\alpha_0$. Therefore, $K=\alpha_0 T_0^2$.

After removing RSS samples with the same location and power reading (samples taken while the scanning device is stationary) N samples remain. Of the total number of samples $N_1$ if $N_1$ RSS samples are taken while the scanning device is stationary, and if $N_2$ RSS samples are taken while the scanning device is moving, the confidence factor can be written as follows:

$$CFn = KN_1 + \sum_{i=1}^{N_2} V_i T_i$$

One example of a confidence factor calculation having this form is as follows, if scanning period is set to one second:

$$CFn = 2N_1 + \sum_{i=1}^{N_2} V_i$$

The value of CFn calculated above is an indicator of the reliability of the estimation of characteristics of a WLAN access point. Interpretation of the CFn value is as follows. As stated above, a relatively small number of RSS samples will translate to almost no reliability of estimation, i.e., one or two samples are not enough for a reliable estimate. Increasing the number of RSS samples has an exponential effect on accuracy. In other words, one RSS sample difference at a low number of samples has a greater impact on accuracy than one RSS sample at a high number of samples. On the other hand, when the number of RSS samples is relatively high, the quality of estimation based on them is high. Further increasing the number of RSS samples does not have a noticeable impact on the accuracy of estimation of characteristics, such as geographic location and radio propagation characteristics, of a WLAN access point. Therefore, as part of a WLAN access point reliability calculation, there will be two thresholds: $CF_{min}$ is a minimum number of samples, on average, that are needed to determine a relatively reliable WLAN access point characteristic estimation. If the number of RSS samples is below this threshold, the estimation is considered unreliable. $CF_{max}$ is a threshold beyond which adding extra RSS samples does not have a significant impact on the accuracy of the estimations.

Since the relationship between confidence factor, CFn, and a reliability measure, R, of WLAN access point characteristics is logarithmic, the reliability is calculated as follows:

$$R = (R_{max} - R_{min}) \frac{[\log(CF_n) - \log(CF_{min})]}{[\log(CF_{max}) - \log(CF_{min})]} + R_{min}$$

The maximum reliability can be set to one, and the minimum reliability can be set to a very small number. For example, $R_{min}=0.001$,
$R_{max}=1$.

The values of CFmin and CFmax can be found empirically. Useful values for a general metropolitan WLAN based positioning system are as follows:

$CF_{min}=36$,
$CF_{max}=68$.

According to embodiments of the invention, the reference database [104] can be scaled according to the classifications of the WLAN access points, the quantification of expected error of access point parameters, or quality of associated WLAN access point data. For example, WLAN access points having a classification or quality measure below a desired threshold may be withheld from the reference database [104]. This ensures that only access points having a relatively high quality of parameter estimation are used by user device [101] in determining a user's position, speed of travel, or direction of travel. In other embodiments, all WLAN access points may be included in reference database [104], but the positioning software [103] may not use access points having a classification or quality measure below a desired threshold.

According to an embodiment of the invention, another example of scaling the reference database [104] includes finding a reliability factor for each WLAN access point in the positioning system, and logged it in reference database [104]. In a WLAN based positioning system, the user has access to the reference database [104] and uses the WLAN access points in range to estimate its position, speed of travel, and direction of travel. The reliability factor of each WLAN access point in the reference database [104] is used to weight the estimation results of the WLAN access points in range of the user. The use of the reliability factors is independent of the positioning algorithm, which is used to estimate the user's attributes, e.g., position, speed of travel, and direction of travel. If estimation in the most general form can be written as an operation O on function $f$ over WLAN access points $AP_N$ in range, $O(f(AP_1), \ldots, f(AP_N))$, the reliability factor is applied to the estimation as follows:

$O(R_1 f(AP_1), \ldots, R_N f(AP_N))$

Where N is the total number of access points in range of the user.

WLAN access points with different reliability factors or quality metrics can be combined in different methods. For example, all WLAN access points can be used to estimate the position of a user, but each WLAN access point is weighted according to its reliability factor. One example is multiplying the estimation results of each WLAN access point by its reliability, and then combining all results to get the final estimation result. Another example is to use only the relatively high quality WLAN access points. In this case, WLAN access points are classified based on their reliability. After detecting all WLAN access points in range, the method starts the estimation process with the WLAN access points in the highest reliability class. Based on the number of WLAN access points in the highest class, a decision is made to either include or exclude WLAN access points in the lower classes. Deciding which of these two example methods to use depends on the use case, as does the decision to include or exclude lower class WLAN access points.

Another dimension that can be added to the CFn calculation is the accuracy of the location of RSS samples. The location of RSS samples may be determined, for example, by a OPS attached to the scanning device. A OPS reports expected Position Error (PE) indicators. The expected Position Error of the OPS location estimations can be used to weight RSS samples as well. Higher weight is given to RSS samples with smaller expected PE values.

It will be appreciated that the scope of the present invention is not limited to the above-described embodiments, but rather is defined by the appended claims, and these claims will encompass modifications of and improvements to what has been described.

What is claimed is:

1. A method of building a reference database used to estimate a position of a wireless local area network (WLAN) enabled device, the method comprising:
    obtaining samples for WLAN access points, the samples for each WLAN access point based on WLAN signals transmitted by the WLAN access point and received by one or more scanning devices;
    estimating, by software of a WLAN positioning system executing on one or more computing devices, a position of each WLAN access point based on the samples of the WLAN access point;
    estimating, by the software of a WLAN positioning system, a geographical area covered by the samples of each WLAN access point;
    determining, by the software of the WLAN positioning system, a quality metric of each WLAN access point based on the estimated geographical area covered by the samples of the WLAN access point; and
    building, by the software of the WLAN positioning system, a reference database based on the estimated position and quality metric of each WLAN access point, the reference database used to estimate the position of the WLAN enabled device.

2. The method of claim 1, wherein the estimating the geographical area covered by the samples is based on a number of the samples and estimated speeds of the one or more scanning devices.

3. The method of claim 2, wherein the estimating the geographical area covered by the samples further comprises:
    weighting a sample collected by a scanning device that is moving according to an estimated speed of the scanning device, the weighting to assign a greater weight to the sample if collected at a higher speed than to the sample if collected at a lower speed.

4. The method of claim 2, wherein the estimating the geographical area covered by the samples further comprises:
    eliminating duplicative samples collected by a scanning device that is stationary.

5. The method of claim 1, wherein the building the reference database further comprises:
    withholding any WLAN access points from the reference database whose quality metric does not meet a threshold.

6. The method of claim 1, wherein the building the reference database further comprises:
    storing the estimated position and quality metric of each WLAN access point in the reference database.

7. The method of claim 6, further comprising:
    determining a plurality of WLAN access points within range of the WLAN enabled device based on signals received by the WLAN enabled device;
    retrieving from the reference database the estimated position and quality metric of the WLAN access points within range of the WLAN enabled device; and
    estimating, by software of the WLAN positioning system, the position of the WLAN enabled device based on the estimated position and quality metric of the WLAN access points within range of the WLAN enabled device, wherein a WLAN access point's effect on the estimated position is weighted according to the WLAN access point's quality metric.

8. The method of claim 6, further comprising:
    determining a plurality of WLAN access points within range of the WLAN enabled device based on signals received by the WLAN enabled device;
    retrieving from the reference database the estimated position and quality metric of the WLAN access points within range of the WLAN enabled device;
    excluding at least one of the WLAN access points within range of the WLAN enabled device having a quality metric that does not meet a threshold; and
    estimating, by software of the WLAN positioning system, the position of the WLAN enabled device based on the estimated position of at least one remaining WLAN access point of the WLAN access points within range of the WLAN enabled device.

9. The method of claim 1, wherein the samples are received signal strength (RSS) samples.

10. The method of claim 1, wherein the scanning device and the WLAN enabled device are different devices.

11. A non-transitory computer readable medium having software stored thereon, the software when executed operable to:
    obtain samples for wireless local area network (WLAN) access points, the samples for each WLAN access point based on WLAN signals transmitted by the WLAN access point;
    estimate a position of each WLAN access point based on the samples of the WLAN access point;
    estimate a geographical area covered by the samples of each WLAN access point;
    determine a quality metric of each WLAN access point based on the estimated geographical area covered by the samples of the WLAN access point; and
    build a reference database based on the estimated position and quality metric of each WLAN access point, the reference database used to estimate the position of a WLAN enabled device.

12. The non-transitory computer readable medium of claim 11, wherein the estimate of the geographical area covered by the samples is based on a number of the samples and one or more estimated speeds of one or more scanning devices that received the WLAN signals transmitted by the WLAN access point.

13. The non-transitory computer readable medium of claim 12, wherein the software when executed is further operable to:
    weight a sample collected by a scanning device that is moving according to an estimated speed of the scanning device.

14. The non-transitory computer readable medium of claim 12, wherein the software when executed is further operable to:
    eliminate duplicative samples collected by a scanning device that is stationary.

15. The non-transitory computer readable medium of claim 12, wherein the software when executed is further operable to:
    withhold any WLAN access points from the reference database whose quality metric does not meet a threshold.

16. The non-transitory computer readable medium of claim 12, wherein the software when executed is further operable to:
    store the estimated position and quality metric of each WLAN access point in the reference database.

17. The non-transitory computer readable medium of claim 11, wherein the samples are received signal strength (RSS) samples.

18. A system for estimating positions of a wireless local area network (WLAN) enabled device, comprising:
   a reference database maintained by one or more computing devices that includes an estimated position and quality metric of each a plurality WLAN access points, the estimated position of each WLAN access point based on WLAN signals transmitted by the WLAN access point, the quality metric of each WLAN access point based, at least in part, upon an estimated geographical area covered by the samples of the WLAN access point; and
   the WLAN enabled device configured to executed a client-side portion of software of a WLAN positioning system, the client-side portion when executed to:
      determine a plurality of WLAN access points within range of the WLAN enabled device based on signals received by the WLAN enabled device,
      retrieve from the reference database the estimated position and quality metric of the WLAN access points within range of the WLAN enabled device, and
      estimate the position of the WLAN enabled device based on the estimated position and quality metric of at least one of the WLAN access points within range of the WLAN enabled device, wherein a WLAN access point's effect on the estimated position of the WLAN enabled device is weighted according to the WLAN access point's quality metric or a WLAN access point is excluded from use in estimating the estimated position of the WLAN enabled device in response to the WLAN access point's quality metric.

19. The system of claim 18, further comprising:
   one or more scanning devices configured to receive the WLAN signals transmitted by each WLAN access point.

20. The system of claim 19, wherein the geographical area covered by the samples is based on a number of the samples and one or more estimated speeds of the one or more scanning devices.

* * * * *

UNITED STATES PATENT AND TRADEMARK OFFICE
CERTIFICATE OF CORRECTION

PATENT NO. : 9,955,358 B2
APPLICATION NO. : 15/158161
DATED : April 24, 2018
INVENTOR(S) : Farshid Alizadeh-Shabdiz et al.

Page 1 of 1

It is certified that error appears in the above-identified patent and that said Letters Patent is hereby corrected as shown below:

In the Specification

Column 3, Line 33 reads:
"received signal strength (RSS) samples of the a Wi-Fi signal"
Should read:
--received signal strength (RSS) samples of a Wi-Fi signal--

Column 5, Line 44 reads:
"coverage area of the an access point."
Should read:
--coverage area of the access point.--

Column 8, Line 63 reads:
"by a OPS attached to the scanning device. An OPS reports"
Should read:
--by an OPS attached to the scanning device. An OPS reports--

In the Claims

Claim 18:
Column 11, Line 14 reads:
"the WLAN enabled device configured to executed a"
Should read:
--the WLAN enabled device configured to execute a--

Signed and Sealed this
Seventh Day of April, 2020

Andrei Iancu
*Director of the United States Patent and Trademark Office*